United States Patent
Baratti et al.

(10) Patent No.: US 10,627,120 B2
(45) Date of Patent: Apr. 21, 2020

(54) BUILDING PANEL INTENDED FOR CREATING HEATING AND/OR COOLING WALLS OF BUILDINGS

(71) Applicant: Keoki Company SA, Villars-sur-Glâne (IT)

(72) Inventors: Alberto Baratti, Quarona Sesia VC (IT); Fausto Bocciolone, Valduggia VC (IT); Paolo Cassetta, Lessona BI (IT)

(73) Assignee: Keoki Company SA, Villars-sur-Glâne (CH)

( * ) Notice: Subject to any disclaimer, the term of this patent is extended or adjusted under 35 U.S.C. 154(b) by 0 days.

(21) Appl. No.: 15/740,681

(22) PCT Filed: Jun. 28, 2016

(86) PCT No.: PCT/IB2016/053848
§ 371 (c)(1),
(2) Date: Feb. 1, 2018

(87) PCT Pub. No.: WO2017/002009
PCT Pub. Date: Jan. 5, 2017

(65) Prior Publication Data
US 2018/0202669 A1    Jul. 19, 2018

(30) Foreign Application Priority Data

Jul. 1, 2015 (EP) ..................... 15174818

(51) Int. Cl.
*F24D 3/14* (2006.01)
*E04C 2/52* (2006.01)
(Continued)

(52) U.S. Cl.
CPC ............... *F24D 3/142* (2013.01); *E04B 5/48* (2013.01); *E04B 9/001* (2013.01); *E04C 2/525* (2013.01);
(Continued)

(58) Field of Classification Search
CPC .......... E04C 2/525; F24D 3/165; F24D 3/125; F24D 3/142; E04B 5/48
See application file for complete search history.

(56) References Cited

U.S. PATENT DOCUMENTS 4,212,348 A * 7/1980 Kobayashi ............... F24D 3/14
165/49
4,619,801 A * 10/1986 Engel ....................... F28F 3/12
264/146
(Continued)

FOREIGN PATENT DOCUMENTS

JP      2002-228170 A    8/2002
KR      20-0264930       2/2002
(Continued)

*Primary Examiner* — Paola Agudelo
(74) *Attorney, Agent, or Firm* — Blank Rome LLP (57) ABSTRACT

The invention relates to a building panel intended for creating heating and/or cooling walls of buildings, comprising: a base element defined by an upper face, a lower face and several lateral faces, circulation means (12) for the circulation of a heat-transfer or cooling fluid, which are arranged on the inside of said base element, a substantially flat conducting element, fixed to the upper face of the base element so as to cover it entirely or almost entirely, said conducting element having good thermal conductivity, mechanical connection means secured to said base element, said mechanical connection means being able to allow removable attachment of said building panel to an identical or similar building panel arranged adjacent to the latter, fluidic-connection means designed to allow the heat-transfer or cooling fluid to circulate between said building panel and an identical or similar building panel attached thereto, leak detection means able to detect a leak of heat-transfer or cooling fluid at the lower or upper face of the base element.

17 Claims, 5 Drawing Sheets

(51) Int. Cl.
*F24D 3/16* (2006.01)
*E04B 9/00* (2006.01)
*E04B 5/48* (2006.01)
*F24D 3/12* (2006.01)
*F24F 5/00* (2006.01)

(52) U.S. Cl.
CPC ............ *F24D 3/125* (2013.01); *F24D 3/165* (2013.01); *F24F 5/0089* (2013.01); *Y02B 30/24* (2013.01)

(56) References Cited

U.S. PATENT DOCUMENTS

| | | | | |
|---|---|---|---|---|
| H239 H | * | 3/1987 | Franklin | F24D 3/142 165/47 |
| 4,723,598 A | * | 2/1988 | Yoshio | F24D 3/125 165/136 |
| 5,497,826 A | * | 3/1996 | Ingram | F24D 13/022 165/56 |
| 7,011,142 B2 | * | 3/2006 | Davies | F02M 31/20 165/170 |
| 2010/0218923 A1 | * | 9/2010 | Kang | F24D 3/12 165/170 |
| 2012/0017525 A1 | * | 1/2012 | Knapp | E04F 13/0866 52/173.1 |
| 2012/0103580 A1 | * | 5/2012 | Buttignol | F24D 3/125 165/169 |
| 2014/0196867 A1 | * | 7/2014 | Tarraga Sanchez | E04B 5/48 165/49 |
| 2015/0159884 A1 | * | 6/2015 | Whang | F24D 3/125 237/69 |
| 2015/0368866 A1 | * | 12/2015 | Hydock | E01C 13/02 165/45 |
| 2017/0299198 A1 | * | 10/2017 | Collins | E04C 2/50 |
| 2018/0003396 A1 | * | 1/2018 | Wojcik | F24D 3/125 |

FOREIGN PATENT DOCUMENTS

| | | |
|---|---|---|
| KR | 2013-0061789 A | 6/2013 |
| WO | WO-2008/143377 A1 | 1/2008 |

* cited by examiner

BUILDING PANEL INTENDED FOR CREATING HEATING AND/OR COOLING WALLS OF BUILDINGS

RELATED APPLICATIONS

This application is a national phase application of PCT/IB2016/053848, filed Jun. 28, 2016, which claims priority to European Application No. 15174818.3, filed Jul. 1, 2015. The entire contents of those applications are incorporated herein by reference.

TECHNICAL FIELD

The present invention relates to a prefabricated modular building panel for producing heating and/or cooling walls of buildings wherein said panel incorporates a technical circuit and a finish making it possible to achieve a very thin thickness. It also relates to a wall formed by the rapid assembly of such panels, as well as a supply system for heat-carrying fluid or coolant designed to be connected to a heating and/or cooling circuit formed within said wall.

STATE OF THE ART

In the field of heating and/or cooling of buildings, it is known to integrate heating and/or cooling circuits inside panels, such as floors, walls or ceilings. Such heating circuits generally consist of an array of tubes inside which a heat-carrying fluid or coolant flows. The disadvantage of this known technique is the need to call on a specialized company to install such circuits. Furthermore, this technique requires major construction work to integrate said tubes inside the walls. It is therefore not suitable for buildings that have been already built, in which the tubes should be integrated into existing walls. Additionally, this known technique has a major disadvantage in case of leakage of heat-carrying fluid or coolant. Indeed, because of the generally long time separating the occurrence of the leak and its detection by the occupants of the building, this type of leakage often results in a significant degradation of the wall and of the building in general, which has the consequence of overly increasing the costs of the repair work afterwards. Moreover, once the leak is detected, it is very difficult for the repairer, given the difficulty of accessing the tubes hidden inside the walls of buildings, on the one hand to know where the leak is and, on the other hand, to quickly and simply replace the faulty tube or tubes. It is therefore often necessary to partially damage the wall to access said tubes.

Modular flooring systems are also known that are designed for laying on pre-existing floors, whether they be finished floors or raw slabs, without applying a binder. These systems, however, generally do not provide a hydraulic system for producing, for example, a heating system. There are several difficulties inherent in implementing such a modular heating system, including:

Every new heating system must achieve an energy efficiency comparable to that of conventional systems.

Modular floors are often used in the context of the renewal of pre-existing buildings, for example to remake a pre-existing floor without resorting to the major works of demolition and laying. The new floor must then be laid without unduly interfering with doors, embrasures, skirting boards, and other pre-existing fixtures, which imposes restrictive thickness limits.

The presence of a circulating fluid requires hydraulic and mechanical connections with great strength and reliability.

Document JP2002228170 discloses a modular floor system incorporating three-way valves for producing heated floors. The panels of this system, however, have a significant thickness. JP2002228170 also provides a large number of hydraulic fittings which are not secured. Furthermore, the panels described in this document do not have finishing and insulation layers, so that, although these panels allow simplification of work compared to conventional heating systems, these important elements must always be implemented by conventional, slow and expensive techniques.

Another important application of modular panels in building technology is that of elevated floors covering a technical gap. This technique arising from major computing centers has now become democratized and is widely used in all kinds of commercial and industrial spaces. There is therefore a need for a system of raised floor modular panels incorporating interconnectable hydraulic circuits specifically adapted to this type of installation.

Conventional solar collectors also use assemblies of identical or similar modules. These facilities ordinarily use screwed conventional hydraulic connections and are placed on roofs or other places difficult to access, without much concern for aesthetics. However, there is a need for modular panels that are quickly assembled, safe and without visible connections, to make solar walls or floors in more frequented and visible places.

DISCLOSURE OF THE INVENTION

The object of the present invention is therefore to propose a solution to the problems mentioned above.

For this purpose, according to the invention, a building panel as defined in claim 1 is proposed.

Other important features of the building panel of the present invention are also defined in the dependent claims 2 to 12.

The invention also relates to a wall according to claims 13 to 14, as well as to a supply system for heat-carrying fluid or coolant according to claim 15.

Thus configured, the invention allows a quick and simplified installation of a heating and/or cooling circuit inside a wall of a building, and without having to call on a specialized company. Furthermore, as the panel of the invention can be installed over an existing wall of the building, it is possible to use the solution of the invention within buildings that have been already built.

In addition, the detection means provided at each panel can immediately detect when a leak occurs and the precise positioning of this leak. Once the leak has been detected, control means can automatically stop the fluid supply system to prevent any additional fluid coming in and/or emit a visual or audible alarm to indicate to the occupants of the building that a leak is happening. In one of the variants of the invention, the shutdown of the fluid supply system will not be automatic, but will result from the manual intervention of an operator. The unfortunate consequences of an excessive spread of the leak inside the building will therefore be avoided. Furthermore, because of the principle of modularity of the panel of the invention, the repairer can easily replace the defective panel or panels without having to dismantle the entire wall. The repair of the leak will be greatly simplified.

The present invention lends itself to the realization of walls in any orientation with respect to the horizontal plane, whether they are floors, walls or ceilings. The examples refer mainly to a floor, for the sake of brevity, without loss of generality. Terms such as "horizontal" and "vertical" refer to the position the panels have when placed on the floor, as illustrated by the figures.

BRIEF DESCRIPTION OF THE DRAWINGS

Other advantages and features of the present invention will be better understood on reading a particular embodiment of the invention and with reference to the drawings in which.

DETAILED DESCRIPTION OF EMBODIMENTS OF THE INVENTION

Figure 1:
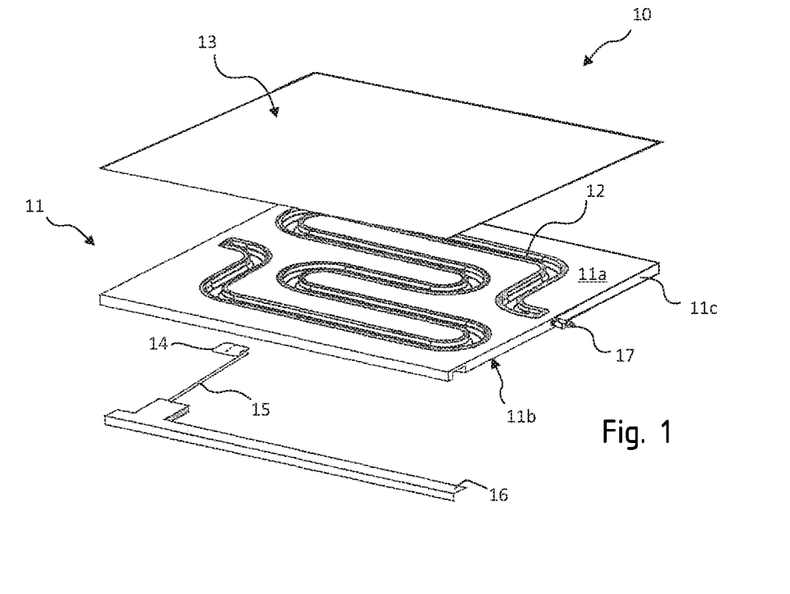
FIG. 1 is an exploded perspective view of a building panel according to the invention.

With reference to FIG. 1, a building panel according to the present invention is shown. This building panel comprises in particular a base element 11 in the form of a substantially rectangular plate of a certain thickness, said plate being defined by its upper face 11a, its lower face 11b and its four lateral faces 11c. The base element 11 will preferably be formed by molding an insulating and flame retardant thermoplastic resin. During the formation of the base element 11, channels 12 have been made at the upper surface 11a, said channels being configured to allow the circulation of a heat-carrying fluid or coolant through the panel. The channels 12 will advantageously be arranged so as to at least partially cover the surface of the base element, thus allowing a homogeneous distribution of heat or cold through the panel. Thus, in one of the possible arrangements shown in FIG. 1, the channels 12 define a coil shape.

The panel also comprises a conductive element 13 in the form of a substantially flat plate, said plate being fixed on the upper face 11a of the base element 11 so as to cover it completely or almost entirely. In a possible configuration of the invention, the conductive element 13 may be of sufficient size to completely cover the upper face of several base elements of several adjacent panels fixed together, said panels defining a wall of a building. The conductive element will have good thermal conductivity and will preferably be made of steel or other metal, stoneware or ceramic. It may be covered with a decorative varnish on its face which is not in contact with the base element, so as to give the panel a particular aesthetic appearance.

In a configuration not shown of the invention, the panel may also comprise an insulating element in the form of a substantially flat plate, said plate being fixed on the lower face 11b of the base element 11 so as to cover it completely or almost entirely. The insulating element will have a low thermal conductivity.

The panel also comprises a rapid assembly/disassembly system integrated into the base element 11 so as to allow the removable attachment of said building panel with a panel of identical or similar construction disposed adjacent to the latter in a wall of a building. In the configuration shown in FIG. 2, this rapid assembly/disassembly system is formed by lugs 9 formed by molding and arranged in a projecting manner on the lower face 11b of the base element 11, wherein said projecting lugs are intended to be received within corresponding recesses formed in the upper face of a base element of the adjacent panel on which is fixed the panel. This attachment may in particular be achieved by snap-in. Other removable mechanical connection means may, however, be envisaged.

Figure 2:
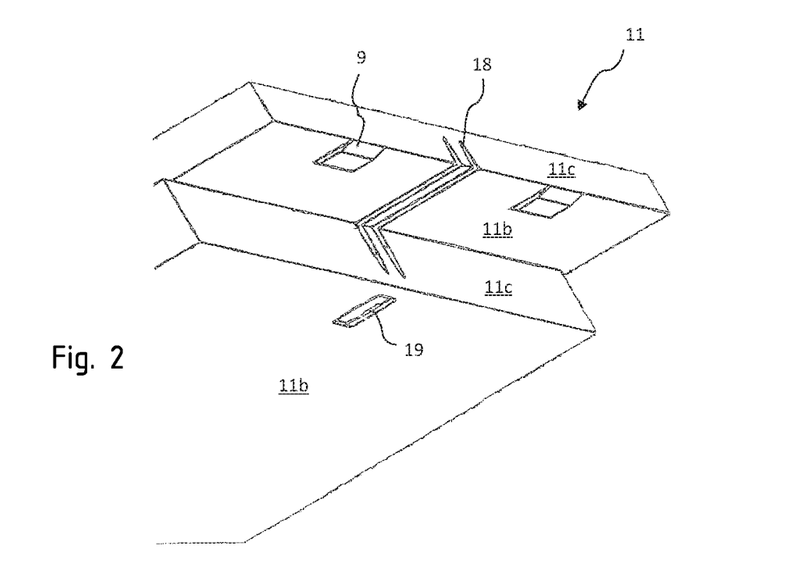
FIG. 2 is a partial view, in perspective and from below, of the basic element of a panel of identical or similar construction to the panel shown in FIG. 1.
Figure 3:
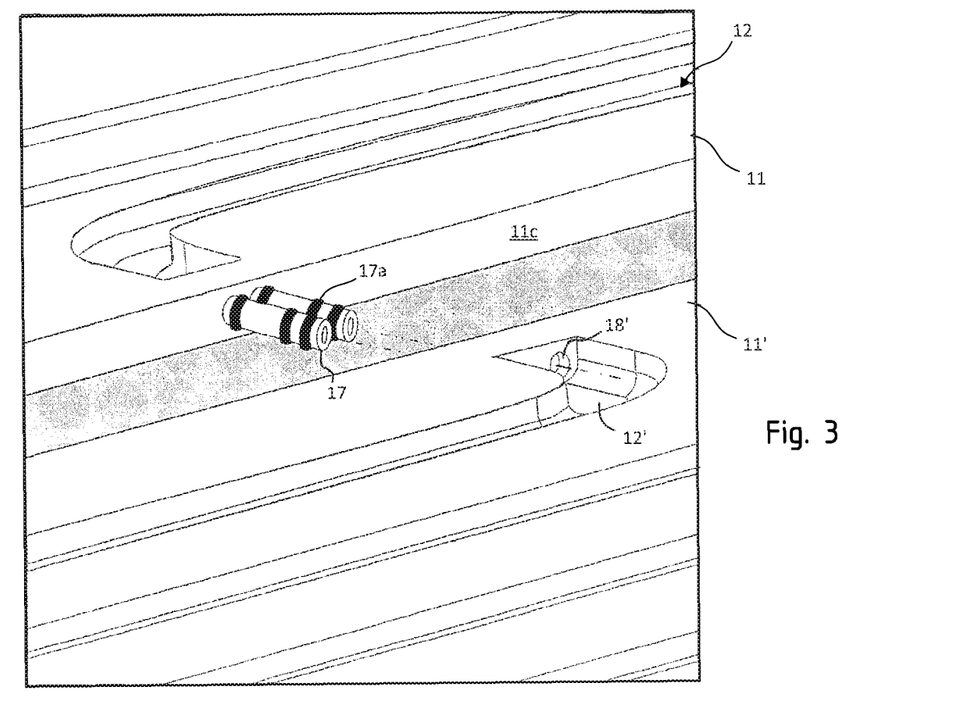
FIG. 3 is a partial view, in perspective and from above, of the respective basic elements of two panels of identical or similar construction to the panel shown in FIG. 2, wherein the view highlights the fluidic connection means provided at level of adjacent side faces of the two panels.

When assembling two adjacent panels, it is important to make the channels of one of the panels communicate with the channels of the other panel so as to ensure the circulation of heat-carrying fluid or coolant between the two panels. For this purpose, and as shown in FIGS. 1 to 3, it is possible to provide one or more hollow tubes or hollow tubular portions 17 protruding at a side face 11c of the base element, said tube or said tubular portion being provided along its periphery, and in a manner spaced apart, with several joints O-ring seal 17a, or other equivalent sealing means. These tubes or tubular portions 17 are configured to be introduced into through-holes 18' formed inside the base element 11' of a panel adjacent to the panel. As shown in FIG. 2, such through-holes 18 may advantageously be formed inside the base element 11 of the panel so as to allow the fluid connection between the panel and an adjacent panel on the side face 11c which is opposite to that shown in FIG. 2. The through-holes 18 and 18', respectively, open at one of their ends on one of the channels 12 respectively 12' of the base element 11, respectively 11', and at their other end on one of the lateral faces of the base element, the position of said through holes being substantially aligned with the position of the tubes or tubular portions 17 when the base elements 11 and 11' are properly positioned to allow the two adjacent panels to be assembled.

Figure 4:
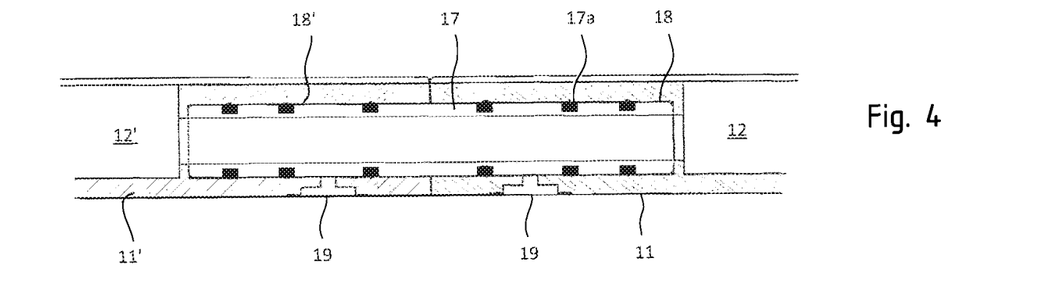
FIG. 4 is a partial view, in section, of a first embodiment of a means adapted to ensure the fluid connection of two adjacent building panels according to the invention.
Figure 5:
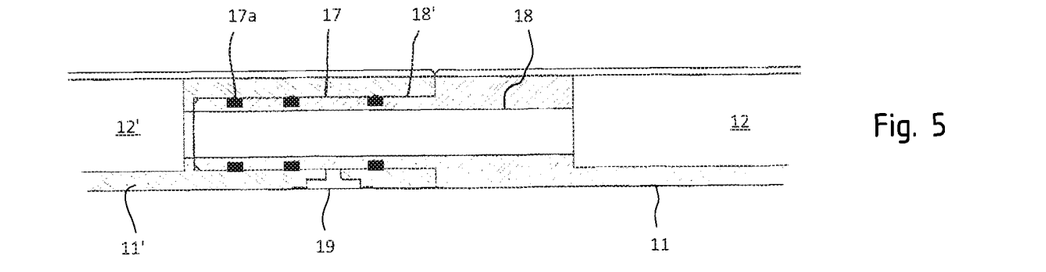
FIG. 5 is a partial view, in section, of a second embodiment of a means capable of ensuring the fluid connection of two adjacent building panels according to the invention.

As shown in FIGS. 4 and 5, several technical solutions can be envisaged for achieving such fluidic connection means.

In the configuration shown in FIG. 4, a tube 17 provided with O-ring type seals 17a is used as a male part and is inserted inside two through-holes 18 and 18' formed respectively in the base elements 11, 11' of two adjacent panels secured together. In this way, one end of the tube 17 is in fluid communication with a channel 12 of the base element 11, and another end of the tube 17 is in fluid communication with a channel 12' of the base element 11'.

In the configuration shown in FIG. 5, a tubular portion 17 provided with O-ring seals 17a and injection molded or co-molded with the base element 11 of one of the panels protrudes from one of the side faces 11c and is inserted inside a through-hole 18' formed in the base element 11' of the adjacent panel. In this way, one end of the tubular portion 17 is in fluid communication with a channel 12' of the base element 11' and another end of the tube 17 is in fluid communication with a through-hole 18 formed in the element base 11, itself opening onto a channel 12 of the base element 11.

In order to detect a possible leakage of fluid at these fluidic connection means, in particular due to the aging or failure of the tightness seals 17a, which generally results in the propagation of fluid at the bottom face 11b of the base element, provision is made to equip the panel 10 with leak detection means. As shown in FIG. 1, such detection means 14 may be positioned under the lower face 11b so as to be in line with a cavity 19 formed in the base element 11, as shown in FIGS. 2, 4 and 5. The cavity 19 thus opens at one of its ends onto the lower face 11b of the base element 11 and at another end onto one of the through-holes 18 or 18'. In case of leakage, the fluid, which has managed to infiltrate between the outer wall of the tube or the tubular portion 17 and the inner wall of the through-hole 18 or 18', fills the cavity 19 and comes into contact with the detector 14, which is configured to generate a signal, particularly of electrical type, in the event of contact with said fluid. This signal is then sent by wire connection to a control unit responsible for managing the operation of a supply system for heat-carrying fluid or coolant. The wire connection may advantageously be disposed inside a groove 16 formed at the bottom face 11b of the base element 11. Other means of connection, including remote, may be considered to transmit the signal to the control unit. This signal will therefore alert the control unit that a leak is occurring on the panel in question. In response to this signal, the control unit will interrupt the supply of heat-carrying fluid or coolant so as to avoid an increased leakage and will eventually emit a visual or audible alarm to the occupants of the building where the defective panel is installed to carry out the necessary repairs. In addition to or in replacement of this control unit, provision may be made to equip the panel 10 with indicator means integrated into the base element 11, said indicator means being able to emit a visual or audible signal when it receives the signal emitted by the detector. Thus, it is conceivable to equip the base element 11 with an LED which will be electrically connected to the detector 14 and which will light up under the action of a current emitted by the detector 14 in the event of contact with the heat-carrying fluid or coolant.

In another configuration (not shown) of the invention, the detection means 14 may be positioned on the upper face 11a of the base element 11 so as to be in line with a cavity formed in the base element 11, said cavity opening at one of its ends onto the upper face 11a and at another end onto one of the through-holes 18 or 18' mentioned above. In case of leakage, the fluid, which has managed to infiltrate between the outer wall of the tube or the tubular portion 17 and the inner wall of the through hole 18 or 18', fills said cavity and comes into contact with the means detection 14. Thus, in this configuration, the leak will be detected by the detection means 14 only once the cavity filled with fluid. This will notably avoid a problem of inadvertent detection of leakage that may occur in the previous configuration, in the case where fluid which has formed around the tube 17 by condensation and has drained inside the cavity 19 under the effect of the gravity comes into contact with the detection means 14 arranged under the lower face 11b of the base element 11. In the present configuration, this problem is avoided because the contact of the fluid contained in the cavity with the detection means 14 occurs only for a minimum amount of fluid, said minimum quantity being much greater than that contained in a drop of fluid formed by condensation.

In a possible configuration of the invention, the detector 14 may consist of a pair of adjacent electrodes maintained at different electrical potentials, each electrode defining a comb shape.

Figure 6:
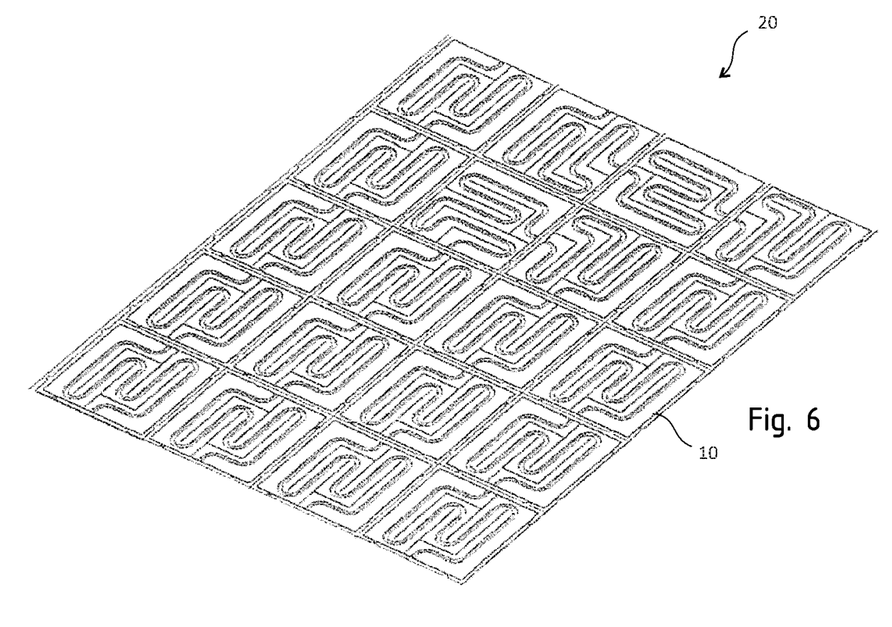
FIG. 6 is a perspective view from above of a wall according to the invention, in which the conductive elements of each of the panels have been removed.
Figure 7:
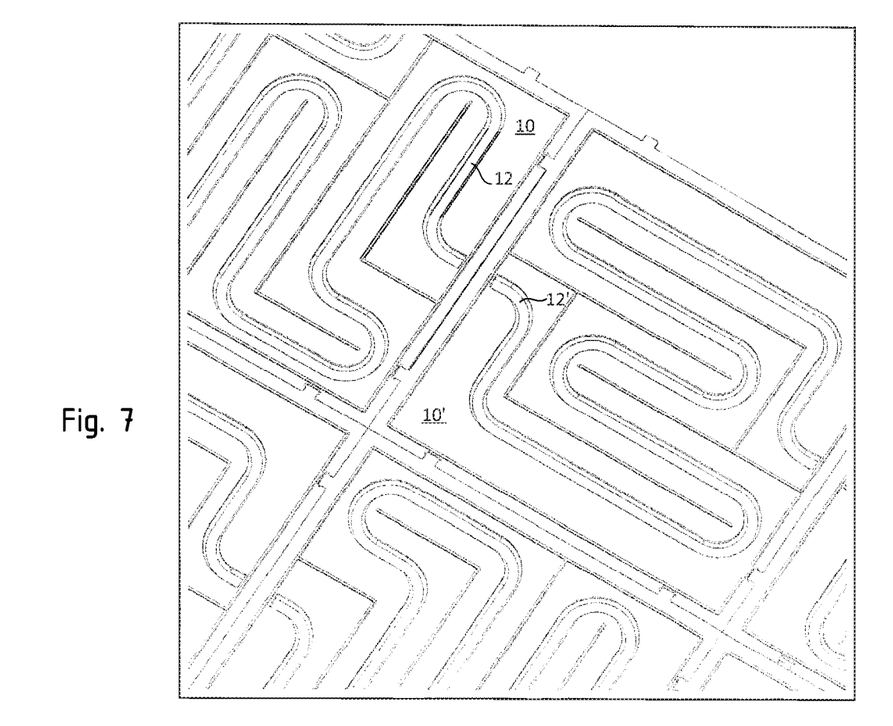
FIG. 7 is an enlarged view of an area of the panel shown in FIG. 6.

Referring to FIGS. 6 and 7, a wall is shown that is formed by the assembly of a plurality of building panels 10 and 10' according to the invention, said panels being connected mechanically and fluidically together so as to achieve one or more heating and/or cooling circuits inside the wall, said circuits being defined by all the channels 12 and 12' of each of the panels. In a possible configuration of the invention, the plurality of panels 10 and 10' may form only part of the wall, the remaining areas of the wall then being formed by conventional building boards.

Figure 8:
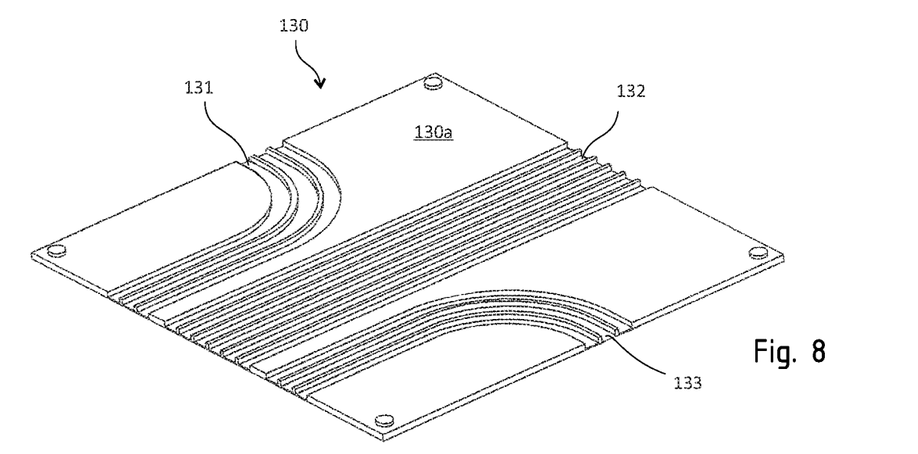
FIG. 8 is a perspective view from above of an additional element that may be part of a panel of identical or similar construction to the panel shown in FIG. 1.

Referring to FIG. 8, an additional element 130 in the form of a substantially flat plate is shown, wherein said plate can be fixed, in particular by gluing, fitting, clipping or embedding, on the lower face 11b of the base element 11 so as to cover it entirely or almost entirely. The face 1a of the plate 130 which is in contact with the base element 11 will advantageously be provided with a series of straight channels 132 or partially curved channels 131 and 133, said channels being adapted to house electrical cables or other wire-type connection cables (not shown). This type of cable is generally used to connect electrical appliances used in a building to the electrical outlets of the building or to connect some of these electrical appliances with one another. By placing them inside the building panels of the present invention, these cables are hidden, which improves the aesthetics of the building and avoids, in the case of a floor, that the occupants of the building are hampered by these cables when moving inside the building.

The panels of the present invention may have any dimensions, whether in length, width or thickness. However, if these panels are installed on existing slabs, they will have the lowest possible thickness so as to fit harmoniously into the building. In this case, their thickness will preferably be between 2.5 and 3 cm.

Figure 9:
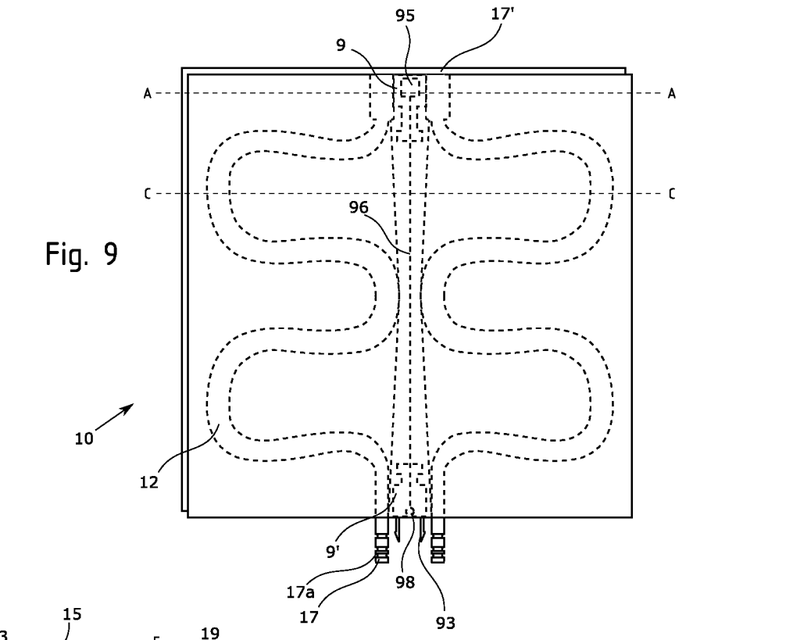
FIG. 9 represents a building panel according to a variant of the invention.

A further later embodiment of the invention will now be described with reference to FIG. 9 and following: FIG. 9 illustrates a building panel 10 with circulation coils 12 made by curved pipes, so as to make a path under the surface of the panel allowing a homogeneous distribution of heat. The elements hidden under the upper face of the panel 10, normally not visible, are represented by lines. FIG. 9 illustrates an arrangement of practical interest with two circulation coils, but this number is not a limitation of the invention. The pipes are preferably metallic, synthetic, or composite. Composite pipes having, for example, a thin metal inner wall covered by a synthetic sheath providing the desired strength.

The hydraulic connection between the panels is achieved by the male connectors 17 on one of the side faces of the panel which are dimensioned to snugly engage with female connectors 17' on a side face of an identical or similar compatible panel. The seal is provided by elastic joints, for example O-rings in the grooves 17a of the male connectors 17. Other sealing means being possible and included in the scope of the invention.

The strength of the mechanical connection between the panels is provided by the male connector 9' on a side face which is arranged to fit into a female connector 9 provided on a side face of an identical or similar compatible panel. In the example illustrated, the male connector 9' comprises an elastic fork 93 which will engage in a housing made in the female connector 9. Other arrangements are however possible.

Advantageously, the panel 10 comprises an unlocking mechanism that makes it possible, by actuating a control element on a side face, to disunite two connectors positioned on another of the side faces, for example an opposite side face. This mechanism allows the extremely rapid disassembly of a wall, ceiling or floor made with the panels of the invention. The invention makes it possible to create or dismantle walls in a few minutes, with an immeasurable advantage compared to conventional installations which, for the same operations, require intervention times in the order of several days.

Figure 10:
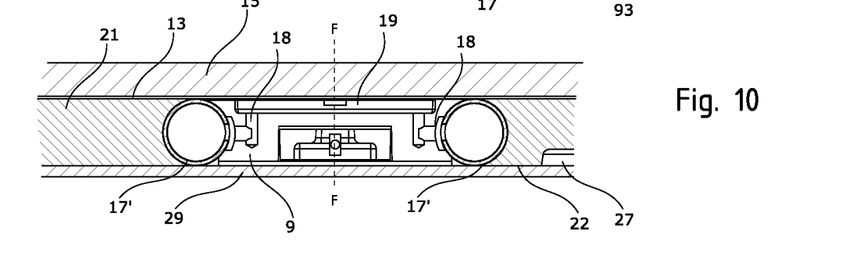
FIG. 10 is a detail of a section (section A-A) of the panel of FIG. 9.

In the illustrated example, which is not the only one possible within the scope of the invention, the unlocking mechanism comprises the eyelet 98 which, through the cable 96, acts on the lock 95 of the female connector 9 on another lateral face, for example the opposite lateral face. FIG. 10 is a detail of the section A-A of the panel 10 which better illustrates the internal structure. The panel includes a thermally conductive element 13 which covers essentially the entire upper face and is made for example of sheet metal, for example sheet steel, aluminum, brass, or any other metal. This element has a thermal function in that it is in direct contact with the circuit 12 and can therefore efficiently transfer the heat energy of the heat-carrying fluid to the ambient surroundings (or conversely, if the circuit 12 is a cooling circuit), and a mechanical function, in that it ensures the dimensional stability of the panel and spreads over the entire surface compression forces when, for example, the panel 10 is used in the construction of a floor.

Preferably, the conductive sheet 13 is covered by an outer finish layer 15 which gives the panel the desired aesthetic appearance, may also have a noise damping function, and fulfills the durability and resistance requirements that are expected from a floor or wall. Any suitable material, for example ceramic, stoneware, stone, wood, or synthetic plastic layers, may be used for producing this layer. Preferably, a relatively thin layer 15 will be made to limit the overall thickness of the panel 10 and not to hinder the heat exchange with the ambient surroundings.

According to another variant of the invention, the building panel 10 could be used to produce a modular solar collector for heating the fluid flowing in the coil 12. In this case, the outer topcoat could be replaced by or include an insulating layer, for example one or more glass plates separated by voids, allowing the light rays to heat the sheet 13, and preventing the loss of radiant energy.

The underside of the panel preferably comprises a layer 29 which damps vibrations and compensates for any unevenness of the floor on which the panel is placed. Between the conductive element 13 and the lower layer 29 (or the ground itself if the layer 29 is omitted) a layer 21 of thermally insulating material having appropriate mechanical characteristics is interposed. Tests with expanded polyurethane foams have provided very favorable results in terms of thermal insulation and resistance to mechanical loads, but other insulating materials are also possible.

Preferably, to reduce heat loss, the insulation layer 21 has cavities 27 and is coupled with a layer of reflective material to reduce energy loss through infrared radiation. It is possible to use for this purpose metal films, for example of aluminum, preferably coupled to a plastic film to improve the tear resistance, or metallized plastic films.

Figures 11, 12, 13:
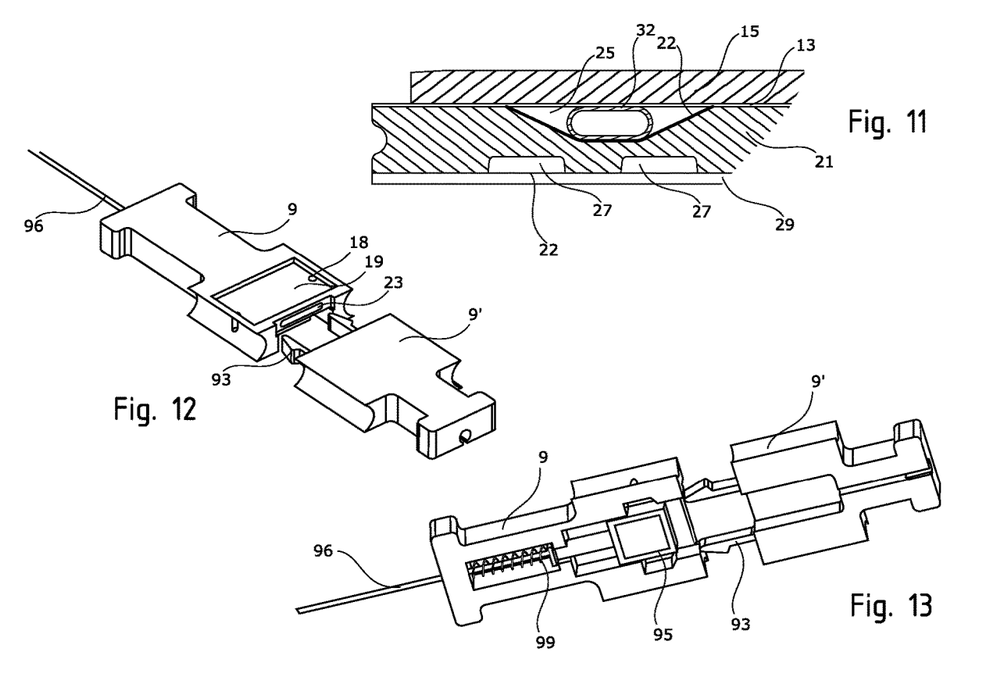
FIG. 11 is a detail of a section (section C-C) of the panel of FIG. 9.
FIGS. 12 and 13 show two views of the mechanical connection elements of the panel of FIG. 9, which incorporate a leak detector.

FIG. 11 illustrates another detail of the section C-C of the panel of FIG. 10. This section intersects the tubing 32 running below the conductive element 13 and shows that the pipe 32 has a flattened section whose major axis is substantially parallel to the upper face of the panel 10. This arrangement is doubly advantageous because, without excessively reducing the hydraulic section, it ensures optimal thermal contact and increases the thickness of the thermal insulation between the pipe 32 and the lower face. As a result, the flattened section allows a better compromise between heat exchange, thermal insulation, and hydraulic head losses. The pipes are preferably metallic, synthetic, or composite.

To further increase the thermal insulation, the pipe 35 is preferably housed in an empty cavity 25 whose inner surface is coated with a reflective layer for infrared radiation 22, for example a metallic or metallized film as mentioned above. In this way, the thermal insulation downward is provided by a superposition of layers comprising: the empty cavity 25; a first reflecting film 22; the insulating material 21; the empty cavities 27; a second reflecting film 22, and optionally the lower layer 29.

FIGS. 12 and 13 illustrate the mechanical connectors 9, 9' and the leak detector 14. The latter comprises, in this example, a manifold 19 in communication with the fluidic connections 17 through the holes 18. The connectors 17 comprise a plurality of successive tightening seals, in this example three O-rings, separated by intermediate volumes. The holes 18 connect the collector 19 with the space between the first O-ring and the second O-ring so that, if the first O-ring develops a leak, the collector 19 will be in fluid connection with the circulation means 12 before a leak develops outwards. As a result, with the collector being in thermal contact with the upper face of the panel 10, it will be possible to observe, in case of leakage, a local variation of the surface temperature of the panel.

A leak will then be detected by a hot (or cold) spot on the surface of the panel in correspondence of the collector 19. Tests have shown that it is possible to diagnose and locate a leak easily, without dismantling the wall, by thermal measurements or thermographies, for example with a thermal camera, an infrared thermometer, or also a thermometer contact probe.

Once the defective panel has been located by the thermal analysis described above, the failure can be confirmed by the presence of fluid in the manifold 19, visible through the window 23. In the example illustrated in FIG. 12, the window 23 is on a side face, accessible by partially dismounting the wall. Other arrangements are however possible.

Figure 14:
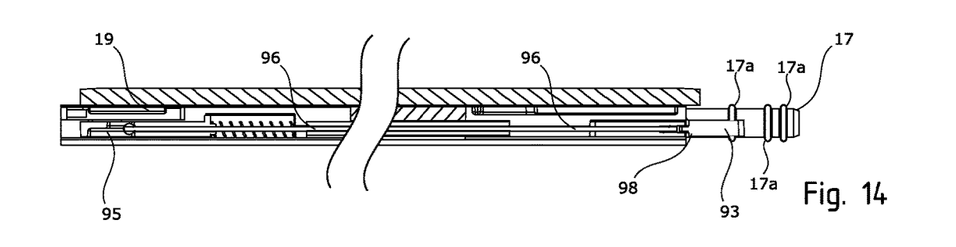
FIG. 14 is a detail of a section (section F-F) of the panel of FIG. 9.

FIG. 13 and FIG. 14, which is a cross-section of the panel according to section (F-F) (visible in FIG. 10), illustrate more particularly the operation of the slide latch 95. A spring 99 holds the lock until a control force is exerted on the eyelet 98.

Advantageously, the locking system of the invention cannot be unlocked by accidental actions, with the lock 95 prohibiting any inadvertent disconnection. Other means equivalent to the lock 95 may be provided, in the context of the invention, to ensure that the mechanical connection means 9, 9' of two adjacent panels can not become disunited by mistake, without a voluntary action on a control element 98.

Figure 15:
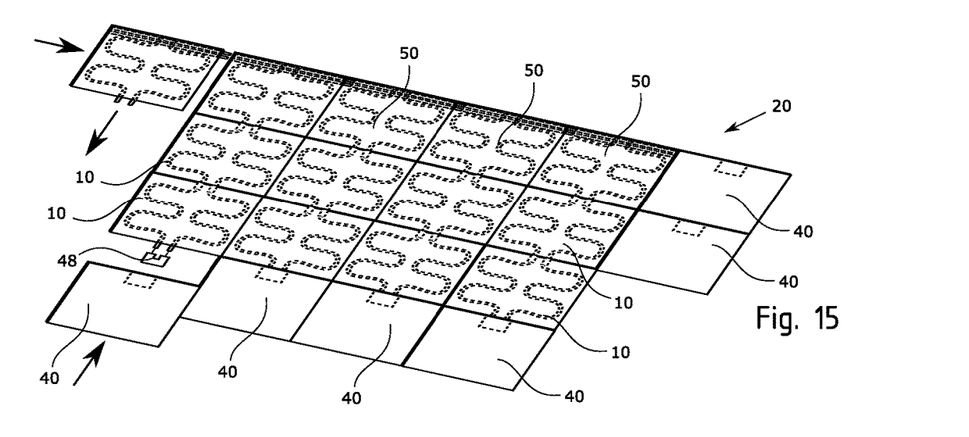
FIG. 15 shows an example of assembly of a wall, floor, or ceiling from the modular panels of the invention.

FIG. 15 shows a possible embodiment of a wall, ceiling, or floor 20 with the panels of the invention. The panels 10 are preferably arranged to form hydraulic circuit branches, branching out of a row of distribution panels 50 which, while being mechanically compatible with the panels 10, and having the same appearance when assembled, have a different hydraulic circuit, arranged to put in parallel several hydraulic circuit branches. In the illustrated example, the panels 50 have three pairs of hydraulic connectors: two, on two opposite lateral faces, for connecting to another distribution panel 50, and a third pair, on a side face oriented at 90°, for connecting to a building panel 10 constituting the beginning of a derivating hydraulic branch.

Naturally, the system of the invention may also comprise prefabricated panels with different hydraulic circuits, for example curved circuits connecting two lateral faces at 90° to one another or special ones adapted to achieve different conformations while ensuring modularity and speed of connection, thus reducing the work on site.

On the side opposite the one where the distribution panels 50 are located, there are closure panels 40. These panels, mechanically compatible with the panels 10, do not have any hydraulic circuit. They can be cut to measure to achieve a wall, ceiling, or floor 20 to the desired dimensions.

The parallel circuits achieved by the panels 10 are terminated hydraulically by a "U" connection, concealed beneath the adjacent termination panel 40. The "U" connection 48 preferably also comprises a control valve, not shown, for equalizing the flow rates in the various circuits.

In the variant of FIG. 14, the panels 10 are assembled together by sliding one towards the other in a horizontal direction, i.e. parallel to their upper face 11a and lower face 11b. Disassembly includes the spacing of the panels also in the horizontal direction, after unlocking. The invention also comprises a non-illustrated variant, in which the hydraulic and mechanical connection means are shaped to allow vertical assembly and disassembly of the modular panels which can be assembled and separated. This variant allows in particular the assembly of raised floors.

Preferably, the wall 20 of the invention is combined with a control unit (not shown), with a thermostat, a differential fluids' leak detector, a circulation pump, a safety valve actuated by the differential leak detector.

The panels of the invention therefore allow the production of heating or cooling floors and walls, or of solar collectors, with a minimum of operations on site, with the thermal and acoustic insulation functions being provided by the prefabricated technical elements described ci—above. In particular, the panels of the invention comprise a finishing layer which, in addition to a considerable reduction in installation costs, also allows the production of a floor or a wall with a thickness well below that of a layer conventional finish applied on known panels. The invention is therefore particularly suitable for laying on existing floors, for example in the context of renovation work.

REFERENCE NUMBERS 9 mechanical connection means
9' mechanical connection means
10 building board
50 distributor panel
40 closure panel
48 U-shaped connector
11 basic element
11a upper face
11b lower face
11c side faces
12 circulation means
13 conductive element
14 leak detection means
15 finishing layer
16 groove
17 fluidic connection means
17a sealing elements
18 holes
18' holes
19 cavity, collector
20 wall, ceiling or floor
21 thermal insulation
22 reflective element
23 window
25 empty space
27 cavity
29 bottom layer
93 fork
94 housing
95 drawer, lock
96 cable
98 hook, eyelet
99 spring
130 additional element
131 curved channels
132 straight channels
133 curved channels

The invention claimed is:

1. Construction panel for producing heating and/or cooling walls of buildings, comprising:
    a base element defined by an upper face, a lower face and a plurality of lateral faces,
    circulation means of a heat-carrying fluid or coolant disposed within the base element,
    a substantially flat thermally conductive element fixed on the upper face of the base element so as to completely or almost completely cover it;
    mechanical connection means integral with the base element, said mechanical connection means being able to ensure a removable attachment of the building panel with a panel of identical or similar construction disposed adjacent to the latter,
    fluidic connection means adapted to allow the circulation of the heat-carrying fluid or coolant between the building panel and a panel of identical or similar construction fixed thereto,
    leak detection means capable of detecting leakage of the heat-carrying fluid or coolant at the lower face or upper face of the base element, wherein the leak detection means include a collector for collecting the heat-carrying fluid or coolant leaking from said circulation means, the collector being in thermal contact with the upper face of the panel so as to generate, in case of leakage, a local variation of the surface temperature of the panel.

2. Construction panel according to claim 1, further comprising a substantially flat thermally insulating element fixed on the underside of the base element so as to completely or almost entirely cover it.

3. Construction panel according to claim 2, wherein the circulation means are at least partially surrounded by an injected polymer matrix, including a polyurethane matrix.

4. Construction panel according to claim 1, the circulation means comprising a coil formed by a pipe of flattened section, with the major axis of the section being parallel to the upper face.

5. Construction panel according to claim 1, wherein the conductive element is covered by a floor-forming finish layer.

6. Construction panel according to claim 5, wherein the conductive element is made of steel, and the finish layer is made of a material from among ceramics, stoneware, wood, plastic.

7. Construction panel according to claim 5, comprising a thermally insulating layer.

8. Construction panel according to claim 7, wherein the thermally insulating layer is separated from the circulation means by a void space, of which an inner wall is coated with a reflective layer for infrared radiation.

9. Construction panel according to claim 5, wherein the thermally insulating layer comprises an injected polymer layer, in particular a polyurethane layer, having molded cavities.

10. Construction panel according to claim 1, wherein the collector is arranged to capture the heat-carrying fluid or coolant leaking from the fluidic connection means.

11. Construction panel according to claim 1, wherein the fluidic connection means comprise a plurality of sealing elements in series, arranged to prevent the leakage of heat-carrying fluid or coolant, at least one intermediate volume between two successive sealing elements being fluidly connected with the leak detection means.

12. Construction panel according to claim 11, wherein the sealing elements are elastic O-rings.

13. Supply system for heat-carrying fluid or coolant in combination with a wall, ceiling, or floor according to claim 12, for which it provides the supply of heat-carrying fluid or coolant, comprising a control unit with a thermostat, a differential fluids' leak detector, a circulation pump, a safety valve that can be actuated by the differential leak detector.

14. Construction panel according to claim 1, wherein the mechanical connection elements comprise an unlocking mechanism with a control element, for separating two adjacent panels by a voluntary action on the control element.

15. Wall, ceiling, or floor comprising a plurality of building panels according to claim 1, said panels being mechanically and fluidically connected together so as to provide one or more heating and/or cooling circuits within the wall, each heating and/or cooling circuit being connectable to a supply system for heat-carrying fluid or coolant.

16. Wall, ceiling, or floor according to claim 15, wherein the heating and/or cooling circuits comprise a plurality of hydraulic circuit branches, further comprising termination elements, to terminate said branches, and building panels, providing distribution elements for arranging in parallel a plurality of said branches.

17. Wall, ceiling, or floor according to claim 16, said termination elements comprising a valve for generating a desired hydraulic head loss.

* * * * *